United States Patent [19]

Carroccio

[11] Patent Number: 4,800,849
[45] Date of Patent: Jan. 31, 1989

[54] TWO CYCLE ENGINE WITH INJECTED FUEL AT INTAKE PASSAGE

[76] Inventor: Joseph A. Carroccio, 56 Walnut St., Johnston, R.I. 02919

[21] Appl. No.: 190,389

[22] Filed: May 5, 1988

[51] Int. Cl.[4] .............................................. F02B 33/04
[52] U.S. Cl. ................................................ 123/73 PP
[58] Field of Search ................. 123/73 B, 73 A, 73 C, 123/73 PP, 52 M

[56] References Cited

U.S. PATENT DOCUMENTS

| | | | |
|---|---|---|---|
| 3,190,271 | 6/1965 | Gudmundsen | 123/73 B |
| 3,730,149 | 5/1973 | Brown | 123/73 B |
| 3,965,873 | 6/1976 | Konomi et al. | 123/52 M |
| 4,333,425 | 6/1982 | Kusche | 123/73 PP |
| 4,492,212 | 1/1985 | Dooley | 123/52 MB |
| 4,625,688 | 12/1986 | Takayasu | 123/73 B |

FOREIGN PATENT DOCUMENTS 134121  10/1919  United Kingdom ............. 123/73 B

Primary Examiner—Charles J. Myhre
Assistant Examiner—David A. Okonsky
Attorney, Agent, or Firm—Barlow & Barlow, Ltd.

[57] ABSTRACT

A two-cycle internal combustion engine with a transfer pressure plate affixed to the intake passage, the transfer port pressure plate has a central aperture with a plurality of jets directed into that central aperture area, the jets being fed by a conduit connected to the crankcase of the internal combustion engine.

2 Claims, 1 Drawing Sheet

TWO CYCLE ENGINE WITH INJECTED FUEL AT INTAKE PASSAGE

BACKGROUND OF THE INVENTION

A two cycle internal combustion engine is provided with transfer passages and porting that allows the delivery of fuel from the crankcase into the combustion chamber above piston. There is provided an intake passage to which a carburetor is attached which introduces fuel into the crankcase space via intake porting for compression upon the downward stroke of the piston. The fuel is thence delivered through transfer passages in the sidewall of the cylinder to a space above the piston for compression. Because of the basic constraints on the structure of a two cycle engine such as briefly described above, there is a limit to the speed with which the intake porting can have fuel delivered to it. The present invention solves this problem by raising the pressure at the intake port so that the fuel may be fed faster and the engine may be permitted to rotate at a higher r.p.m.

SUMMARY OF THE INVENTION

The present invention is therefore concerned with improvements in the intake passage arrangement so as to increase the delivery of fuel into the combustion chamber. The increase in fuel delivery consequently improves the operation of the engine by providing a transfer plate at the intake passage. Accordingly, therefore, the intake porting is arranged in such a way that fuel is not only delivered in the normal fashion through the carburetor and through the intake passage, but also fuel is reatomized by a jet action of feeding fuel into the intake passage during the portion of the cycle where fuel is being transferred from the crankcase to the combustion chamber. According to the invention, this is accomplished by providing a transfer plate at the intake passage on the side of the cylinder which is between the carburetor and air intake and the cylinder intake porting. The transfer plate is provided with a central aperture of at least the same diameter as the intake passage and communicating with this aperture is an enlarged recess into which a plurality of jets are directed. The jets are fed directly from the crankcase so that in effect, the jets are supplied with the fuel/air mixture as the piston descends compressing the same so that it increases the intake of fuel during this portion of the cycle.

DESCRIPTION OF THE PREFERRED EMBODIMENT

Figure 1:
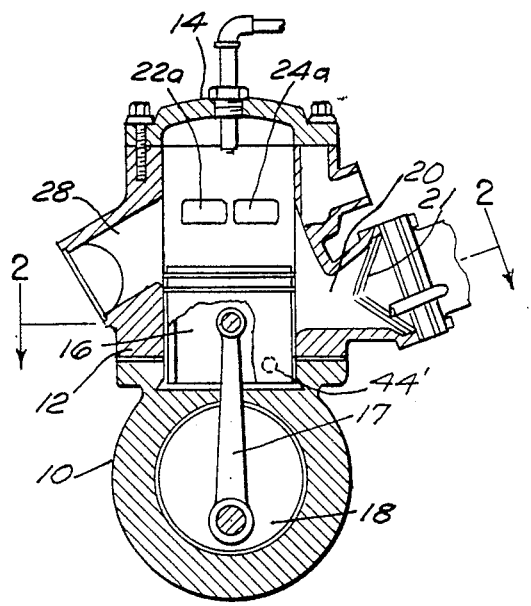
FIG. 1 is a sectional view taken substantially centrally through the cylinder and crankcase of a typical two cycle engine having an intake and exhaust ports with the transfer pressure system plate installed.

In FIG. 1 there is shown a representation of a typical two-cycle engine that has a housing that is made up of generally three portions, there being a lower crankcase portion 10, a central cylinder portion 12 and a head portion 14. These three portions interfit with each other and are held together with suitable fasteners as well known to those skilled in the art. A piston 16 is mounted for reciprocation within the cylinder 12 and has a connecting rod 17 eccentrically mounted upon the crankshaft 18.

The cylinder 12 has an intake passage or chamber 20 and includes transfer passages 22, 23 on the two sides of the cylinder (see FIG. 2) as well as a porting 24, 25 from the intake chamber 20 which insures that the openings as at 24a and 22a are exposed in the cylinder above the piston when the piston is in the bottom dead-center position as illustrated in FIG. 1. Combustible gasses inletted during the upward stroke are pressurized beneath the piston and in the crankcase by the piston throughout its downward stroke towards the bottom dead-center position as illustrated in FIG. 1. Gasses, therefore, from the crankcase flow through passage ways 22, 23 and enter the cylinder above the piston 16.

Figure 2:
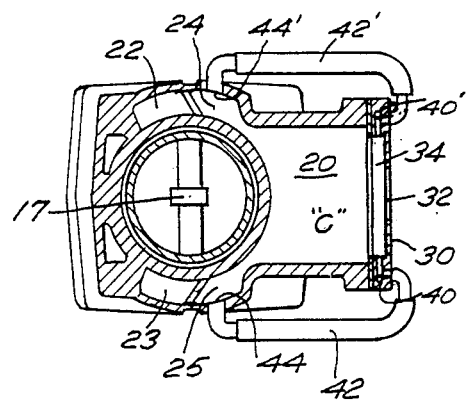
FIG. 2 is a top view illustrating the interconnecting piping to the transfer pressure plate.
Figure 3:
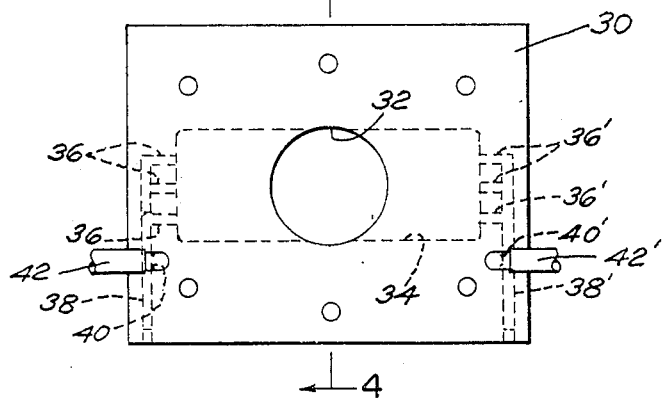
FIG. 3 is a plan view of the pressure plate.
Figure 4:
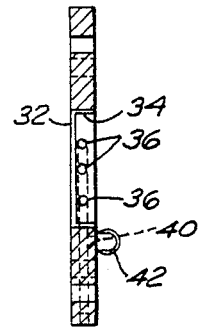
FIG. 4 is a sectional view taken on lines 4—4 of FIG. 3.

The cylinder 12 also includes an exhaust port 28 which has a lower point that is substantially even with the top of the piston 12 and its bottom dead-center position as illustrated so as to obtain full scavaging of the exploded gasses. Referring now to FIG. 3, the transfer port pressure system is achieved by the utilization of an adaptor plate as designed 30. This plate is affixed to the inlet port 20 as seen in FIGS. 1 and 2 and is provided with a central opening or aperture 32 therethrough which is substantially the size of the cover plate that adapts the port to the carburetor outlet chamber. The plate is provided with a recess 34 that communicates with aperture 32 into which a plurality of jets 36, 36' are directed. The jets are connected on each side of the recess by a common bore 38, 38' which thence leads to an outlet connector as at 40, 40'. As seen in FIG. 2, the connection 40, 40', is led via a hose or other suitable conduit 42, 42', into the interior of the crankcase as at 44, 44'. By virtue of this arrangement, the pressurized fuel in the crankcase is admitted through the jets 36 into the intake chamber which creates an additional fuel supply by virtue of the raised pressure which also reatomizes the fuel entering into the intake port. For sake of simplicity, it should be noted that a reed valve assembly 21 is included in the intake port as seen in FIG. 1 and in the position labeled "C" in FIG. 2 of the drawings. The reed valve, as known to those skilled in the art, generally consists of a cage of wedge shape having a plurality of reeds on the base end of the wedge anteriorly open to the fuel supply passage. Such a reed construction is important merely for the complete understanding of the operation of the device so that it is completely understood that the instant transfer plate is essentially upstream of the reed valve body or cage.

It will be understood that the supply of fuel to the combustion space above the piston is augmented by the jet action from the transfer pressure plate which acts something like an injector and this action has an appreciable effect over a substantial range of engine speeds but is particularly significant at high engine speeds. Also it should be appreciated, that when 10 the engine is operating with the invention in place that there will be a fuel mixture supplied to the chamber above the piston via the transfer ports even when the intake port is closed by the position of the piston. It is believed that this effect is partially responsible for the improved operation.

I claim:

1. In a two-cycle crankcase compression type internal combustion engine that has a cylinder with a piston movable between a top and bottom position and in which there is fuel intake porting in the cylinder controlled by the piston and passage means thereto, there being exhaust porting on the side of the cylinder substantially opposite the intake port, the improvement consisting of a transfer pressure plate fixed to the intake passage, said plate having a central aperture with a plurality of jets directed toward the central aperture, said jets being connected via conduits to the crankcase of the internal combustion engine.

2. In a two-cycle engine as in claim 1 wherein the plate has a recess surrounding the central aperture and wherein said recess is defined by edge walls, an open top and bottom wall, and wherein the jets are in the edge walls.

* * * * *